(12) United States Patent
Berzati et al.

(10) Patent No.: US 12,470,379 B2
(45) Date of Patent: Nov. 11, 2025

(54) LINK ENCRYPTION AND KEY DIVERSIFICATION ON A HARDWARE SECURITY MODULE

(71) Applicant: THALES DIS CPL USA, INC., Austin, TX (US)

(72) Inventors: Alexandre Berzati, Fuveau (FR); Loic Bonizec, Saint Maximin (FR); Dmitry Ryumkin, Kanata (CA); Darren Johnson, Ottawa (CA)

(73) Assignee: THALES DIS CPL USA, INC., Austin, TX (US)

( * ) Notice: Subject to any disclaimer, the term of this patent is extended or adjusted under 35 U.S.C. 154(b) by 188 days.

(21) Appl. No.: 17/981,548

(22) Filed: Nov. 7, 2022

(65) Prior Publication Data
US 2024/0154799 A1    May 9, 2024

(51) Int. Cl.
*H04L 9/08* (2006.01)
*G06F 13/42* (2006.01)
*H04L 9/06* (2006.01)
*H04L 9/32* (2006.01)

(52) U.S. Cl.
CPC ........ *H04L 9/0877* (2013.01); *G06F 13/4282* (2013.01); *H04L 9/0631* (2013.01); *H04L 9/3239* (2013.01); *G06F 2213/0026* (2013.01)

(58) Field of Classification Search
CPC ... H04L 9/0877; H04L 9/0631; H04L 9/3239; G06F 2213/0026; G06F 13/4282
See application file for complete search history.

(56) References Cited

U.S. PATENT DOCUMENTS

| 11,429,414 B2 | 8/2022 | Liguori et al. |
| 2015/0358161 A1 | 12/2015 | Kancharla et al. |

(Continued)

FOREIGN PATENT DOCUMENTS

| AU | 2017290741 B2 | 10/2019 | |
| DE | 102019128141 A1 * | 6/2020 | ......... G06F 13/4221 |
| WO | 2022153055 A1 | 7/2022 | |

OTHER PUBLICATIONS

International Search Report (PCT/ISA/2010) & Written Opinion (PCT/ISA/237) mailed by ISA/EP on Feb. 8, 2024 for corresponding International Application pursuant to the PCT, N°PCT/US2023/036092 (13 pages).

(Continued)

*Primary Examiner* — Shewaye Gelagay
*Assistant Examiner* — Samikshya Poudel

(57) ABSTRACT

A Hardware Security Module (HSM) (900), and method thereof, suitable for use in securely servicing cryptographic requests from multiple tenant applications to preserve end-to-end privacy is provided. A Link Encryption and Key Diversification interoperability (43) between two processors provides cryptographic and logical isolation between multiple tenant applications on the HSM (900) that use and share more than one PCIe Physical Function (30) over more than one Virtual Function (VF) (21) to one or more Crypto Units (CU) (61) for satisfying a request (46) of an HSM cryptographic services. An Output Feedback (OFB) block with CRC support is further provided with encryption and decryption. The HSM as configured is more resistant to side channel attacks.

10 Claims, 10 Drawing Sheets

(56) References Cited

U.S. PATENT DOCUMENTS

| | | | | |
|---|---|---|---|---|
| 2016/0028551 | A1* | 1/2016 | Hussain | H04L 63/06 |
| | | | | 713/156 |
| 2016/0142746 | A1* | 5/2016 | Schuberth | H04N 21/236 |
| | | | | 725/31 |
| 2020/0153623 | A1* | 5/2020 | Asanghanwa | H04L 9/3213 |
| 2020/0177383 | A1* | 6/2020 | Iyer | G06F 21/44 |
| 2020/0186358 | A1* | 6/2020 | Capola | H04L 9/3228 |
| 2020/0403779 | A1* | 12/2020 | Gopal | G06F 11/1044 |
| 2021/0286901 | A1* | 9/2021 | Sinha | G06F 9/547 |
| 2022/0067221 | A1* | 3/2022 | Schiattarella | H04L 9/088 |
| 2023/0188340 | A1* | 6/2023 | Osborn | G06Q 20/3226 |
| | | | | 380/286 |

OTHER PUBLICATIONS

NXP—Freescale C29x Crypto Coprocessor Family Product Brief—Document No. C29xPB—Rev. 1, Jul. 2015 (14 pages).

NXP—FTF2016—Technology Forum—QorIQLS2088A PCIE EP SR-IOV Programming Flow—FTF-DES—N1852—Richard Nie—Principal Engineer—FTF-DES-N1852—May 18, 2016—Public Use (80 pages).

Accelerating Post-QuantumCryptographyusingan Energy-EfficientTLSCrypto-Processor—UtsavBanerjee, SiddharthDasy and AnanthaP.Chandrakasan—Massachusetts InstituteofTechnology, Cambridge,Ma,USAyIndian InstituteofTechnologyKharagpur,WB,India (7 pages).

\* cited by examiner

700

750

LINK ENCRYPTION AND KEY DIVERSIFICATION ON A HARDWARE SECURITY MODULE

TECHNICAL FIELD

The present embodiments relates generally to cryptographic accelerator devices, and more particularly, to virtualization of a Hardware Security Module (HSM) with logical isolation between multiple tenants for improved side channel security.

BACKGROUND

A Hardware Security Module (HSM) is a dedicated crypto processing unit specifically designed for the hardware protection of the cryptographic key lifecycle. HSMs act as trust anchors that protect the crypto infrastructure of some of the most security-conscious organizations in the world by securely managing, processing, and storing cryptographic keys inside a hardened, tamper-resistant device. Enterprises use hardware security modules to protect transactions, identities, and applications, as HSMs excel at securing cryptographic keys and provisioning encryption, decryption, authentication, and digital signing services for a wide range of applications.

HSM protect keys and are used by applications in on-premise, virtual, and cloud environments. They are hardware appliances that can be stored in racks in a data center and associated with cryptographic networking components. They are deployed and securely configured remotely in any of these environments. Because they are secure and operate on sensitive data, only authorized applications are allowed access. Multi-tenant HSM architectures are gaining popularity with robust performance at lower costs to handle multiple clients within a same HSM. In a cloud deployment, a single HSM may be purposed to support multiple client applications, which is known as multi-tenancy.

Multi-tenant HSM architectures can offer certain advantages: easier integration and management, load balancing across clusters, dedicated security configurations, and legal compliance. Some HSM platform models in the cloud support multi-tenancy on virtual clustered multi-processing enabled systems. Clusters can contain multiple HSMs, spread across multiple availability zones in a local region, wherein HSMs in a cluster are automatically synchronized and load-balanced. One direct benefit of an HSM that supports multi-tenancy is that one may create a virtual HSM as a partition for each virtual HSM guest that processes cryptographic traffic.

However, one primary security concern with hosting multiple tenants across virtual applications on a same virtual HSM is ensuring that concurrently running applications on the same or different processors do not have access to another application's data, memory, processes or other sensitive information.

SUMMARY

In some embodiments, an electronic hardware sub-system within a Hardware Security Module (HSM), and method thereof, suitable for use in securely servicing cryptographic requests from multiple tenant applications thereon to preserve end-to-end privacy is provided. The electronic hardware sub-system comprises: a Main Processor (MP) incorporating more than one Virtual Function (VF) providing cryptographic services over more than one Peripheral Component Interconnect Express (PCIe) Physical Function (PF), and a Security Processor (SP) responsive and supportive to said cryptographic services over a PCIe communication channel by way of one or more Crypto Units (CU) thereon communicatively coupled to the more than one Peripheral Component Interconnect Express (PCIe) Physical Function (PF) (30). Also provided is a Link Encryption and Key Diversification interoperability between the MP and SP providing cryptographic and logical isolation between multiple tenant applications on said HSM individually using and sharing said more than one PCIe PF over said more than one Virtual Function (VF) to the one or more Crypto Units (CU) for satisfying a request of said cryptographic services.

In some embodiments, the electronic hardware sub-system of claim 1, further comprises a HSM Key Diversification Function (KDF) to provide said Link Encryption and Key Diversification interoperability wherein the KDF receives as input parameters: an AES-256 Session Key, a Virtual Function (VF) Identifier (ID) or Customer Nonce, and a Crypto-request Initialization Vector (IV)

In some embodiments, the KDF produces as output an AES-256 VF Key specific to a particular VF of the more than one Virtual Function (VF) thereafter used for Link Encryption and Key Diversification interoperability to securely encrypt and decrypt data transmitted over the PCIe communication channel created between the MP and the SP over a particular PF of the more than one Peripheral Component Interconnect Express (PCIe) Physical Function (PF).

In some embodiments, the PCIe communication channel is created for a particular VF is secured by using AES 256 block encryption with the AES-256 VF Key derived by way of the KDF using said input parameters.

In some embodiments, the method or MP encrypts outgoing sensitive data to the SP within the request for said cryptographic services using the AES-256 VF Key; and the method or SP decrypts incoming sensitive data from the MP within the request for said cryptographic services using the AES-256 VF Key In some embodiments, said MP includes its own KDF to produce an AES-256 VF Key specific to each particular VF thereon; and said SP includes its own KDF to produce the same said AES-256 VF Key specific to said each particular VF of said MP In some embodiments, the AES-256 Session Key and AES-256 Session Key are created by one of a DH, ECDH or Kyber key exchange using the NIST P521 curve, wherein by way of the MP the key exchange is: i) negotiated between one or more Central Processing Units (CPU) of the MP and one or more Central Processing Units (CPU) of the SP, thereby producing a session key; and ii) the AES-256 VF Key is obtained by a Hash (SHA3) of the session key.

In some embodiments, the AES-256 Session Key is computed between the MP and SP at every Power-On-Reset or upon MP request.

In some embodiments for Key Diversification interoperability on the SP once said request for cryptographic services is received from the MP, a VF number field is analyzed in the request, and an identified Crypto Unit (CU) is designated to: check in a VF Key Cache if the AES-256 VF Key is available for that CU, otherwise, generate the AES-256 VF Key by way of the KDF on the SP for that CU; and use the AES-256 VF Key for securely encrypting and decrypting data across the PCIe communication channel.

In some embodiments, the request comprises a mix of secure and non-secure data, and a packet header for the request indicates which data are encrypted and not encrypted so that the identified Crypto Unit will respectively decrypt and not decrypt the data received.

In some embodiments, said SP receives from the MP the packet header comprises: [EncFlag=0–M‖EncFlag=0–N‖EncFlag=1–Enc(s)], where ‖stands for concatenation.

In some embodiments, the MP provides data transfer error detection of plaintext data and IV transmitted across the PCIe communication channel via Cyclic Redundancy Check (CRC) encryption and CRC decryption.

In some embodiments, the Output Feedback (OFB) encryption scheme via MP or method comprises: computing CRC on plaintext data an IV to produce Dcrc; computing AES-256 VF Key using VF Number and AES-256 Session Key; encrypting plaintext data in AES-256 Output Feedback (OFB) Mode using as input Initialization Vector (IV) to produce encrypted data; and transmitting the encrypted data and store (Data) and related IV Dcrc in memory.

In some embodiments, the Output Feedback (OFB) decryption scheme via SP or method comprises: recovering (Data) Dcrc from Descriptor Field of a received packet message; recovering VF Number and compute VF AES-256 key or retrieve from key cache; decrypting the encrypted data in AES-256 Output Feedback (OFB) Mode using as input Response Initialization Vector (Resp-IV); and checking CRC on Decrypted Data and compare to Dcrc in memory (15).

BRIEF DESCRIPTION OF THE DRAWINGS

The accompanying drawings, which are incorporated in and constitute a part of this description, illustrate embodiments consistent with the embodiments and, together with the description, serve to explain the principles of the embodiments.

Figure 1:
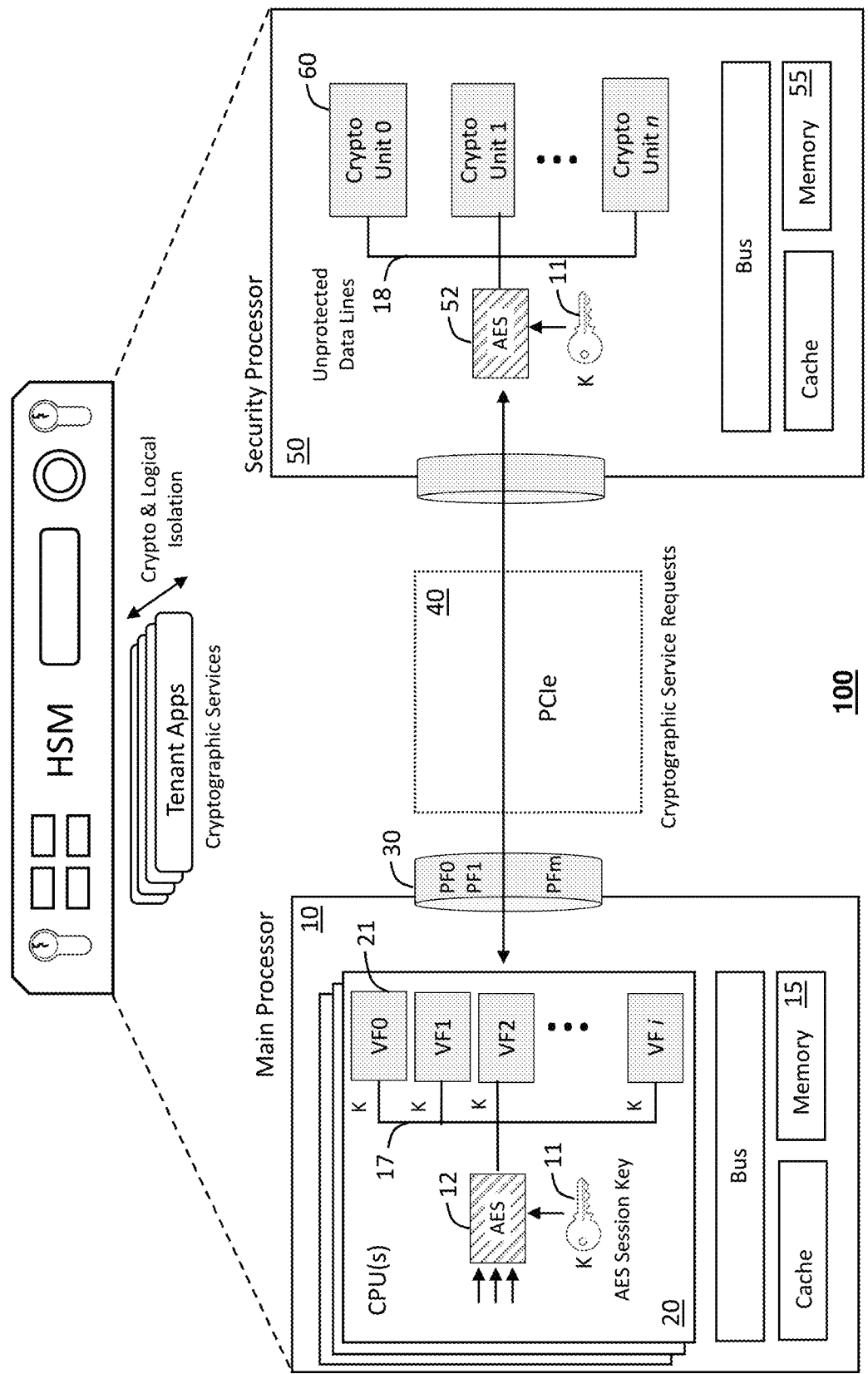
FIG. 1 illustrates a Hardware Security Module (HSM) for hosting multiple tenants, wherein the HSM handles cryptographic service requests for each tenant in accordance with one embodiment.

Specific embodiments have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the embodiments. Instead, they are merely examples of apparatuses and methods consistent with aspects related to the embodiments as recited in the appended claims.

In the context of the present description, an HSM is a hardened, tamper-resistant hardware device that secure cryptographic processes by generating, protecting, and managing keys used for encrypting and decrypting data and creating digital signatures and certificates. A "payments HSM" is an HSM for use in financial payments industry. A "hosted HSM" is a payments HSM physically hosted by a computing service provider, for example, within a data center. A "cloud HSM" provides same functionality as on-premises HSMs with the benefits of a cloud service deployment, without the need to host and maintain on premises appliances. A HSM deployment can provide for Software as a Service (SaaS), Platform as a Service (PaaS), or Infrastructure as a Service (IaaS) models.

A "general purpose" (GP) HSM is a hardened, tamper-resistant hardware device that strengthen encryption practices by generating keys, encrypting and decrypting data, and creating and verifying digital signatures. GP HSMs may be assembled in clusters and act as a single hardware Root of Trust. It is a critical component of public key infrastructures (PKIs) to generate and protect root and certificate authority keys; code signing to ensure software remains secure, unaltered and authentic; and creating digital certificates for credentialing and authenticating proprietary electronic devices for Internet of Things (IoT) applications and other network deployments. A General Purpose HSM is flexible and can be used in any application that uses cryptographic keys which does not require the additional security controls and regulations imposed by a Payment HSM. Examples include management of the symmetric keys used for database encryption, and management and use of the asymmetric keys used for the creation of digital signatures and certificates to support PKI (Public Key Infrastructure) and crypto wallets.

A "payment" HSM is a hardened, tamper-resistant hardware device that is used primarily by the retail finance or banking industry to provide high levels of protection for cryptographic keys and customer PINs used during the issuance of magnetic stripe and EMV chip cards (and their mobile application equivalents) and the subsequent processing of credit and debit card payment transactions. Payment HSMs normally provide native cryptographic support for all the major card scheme payment applications and undergo rigorous independent hardware certification. Payment HSMs and management tools provide flexible, efficient transaction security for retail payment processing environments, internet payment applications, and web-based PIN delivery.

The main role of a payment HSM is to protect cryptographic keys and other security sensitive data in a highly secure manner, such that the integrity of the overall payment process is maintained, and provide audit and system logs of HSM usage. To that end, HSMs offer the highest level of security by always storing cryptographic keys in intrusion-resistant hardware and providing up to date reporting of its operation. Commonly, HSMs are housed in a data center of a computing resource provider or any similar securely hosting area. More specifically, any HSM hosted in the data center may be attached directly to a server, for instance in a rack, and can be accessed on-site by an operator e.g., through console attach to the HSM via a universal serial bus (USB) connection implementing a USB-C interface, for example.

In described embodiments, there will be considered the non-limiting example of a cloud-based (web-based) system architecture, wherein one or more virtualized HSMs is housed in a data center and is accessible/configurable by users, or operators, through the Internet as a communication network to provide logical and cryptographic isolation between virtual processes on the HSM, wherein a virtual function therein may share same hardware resources of the HSM with other tenants. An operator is a user with administrative privileges for configuring the HSM, for example, a system administrator having their own password and a separate device card, such as a Java Card, for providing additional credentials. Here, a user can also refer to an operator with special privileges above a normal user.

FIG. 1 illustrates a Hardware Security Module (HSM) for hosting multiple tenants in accordance with one embodiment. Within the HSM are two processors: a main processor 10, also referred to as a host, and a security processor 50, also referred to as a cryptographic co-processor. The security processor 50 may be in the form of an Application Specific Integrated Circuit (ASIC), and Field Programmable Gate Array (FPGA) or other hardware hardware based cryptographic accelerator. The security processor 50, including its one or more Crypto Units (CU) 60, is optimized for Public Key Infrastructure (PKI) algorithms such as RSA, Diffie Hellman, and Elliptic Curve Cryptography (ECC), which serve as the basis of digital signature and key exchange protocols that make secure transactions possible between not only the main processor 10 and security processor, but also the main processor 10 and any client/tenant application running on the HSM and communicating with other servers or computers on the network.

The main processor 10 includes one or more virtual functions (VF) 21. Virtualization allows an HSM administrator to take advantage of underutilized physical hardware by running more than one virtual machine (VM) on the main processor 10. The Main Processor (MP) 10 incorporates more than one Virtual Function (VF) 21, each providing cryptographic services over more than one Peripheral Component Interconnect Express (PCIe) Physical Function (PF) 30 to the Security Processor (SP) 50, responds and supports the cryptographic services over the PCIe communication channel by way of one or more Crypto Units (CU) 60 thereon communicatively coupled to the more than one Peripheral Component Interconnect Express (PCIe) Physical Function (FP) 30. The main processor 10 is communicatively coupled to the security processor 50 over a PCIe link 40 by way of the multiple Ethernet ports to the one or more Physical Functions 30. The PCIe link 40 is securely shared across the one or more multiple Virtual Functions (VF0, VF1 . . . VFi) 21.

In one arrangement the VFs 21 are logical processors assigned to a VM, which are effectively thread schedulers. Each VF 21 is a single virtual processor to schedule a single thread to run at a time, and therefore, use at least one of the Central Processing Units (CPUs) on the main processor 10. Each VF 21 can support at least one single Input/Output (IO) resource to a corresponding physical function (PF) 30 of the PCIe link/interface 40. Once the main processor 10 is configured for virtualization it can thereafter enable its respective physical functions (PFs) 30 wherein each virtual function 21 can access the PCIe configuration space of the PF 30 by was of a bus, device, and function number of the physical function. Each virtual function 21 has a PCI memory space, which is used to map its register set. Each virtual function (e.g. VF0, VF1 . . . VF i) 21 is a device driver that operates on the register set to enable its functionality, where the virtual function 21 appears as an actual PCI device.

The Physical functions 30 (e.g. PF0, PF1, . . . PFm) are fully featured PCIe functions that can be discovered, managed, and manipulated like any other PCIe device. Physical functions 30 can be used to configure and control a PCIe device. Each PF 30 can however be shared by many VFs 21, or corresponding virtual machines. Briefly, a virtual function is a lightweight PCIe function that shares one or more physical resources with the physical function and with virtual functions that are associated with that physical function. Unlike a physical function, a virtual function can only configure its own behavior. The shared PF 30 PCIe devices provide dedicated resources and also use shared common resources. In this way, each VF 21 has access to unique resources of the main processor. Therefore, a PCIe device, such as an Ethernet port, that is single root Input/output (IO) virtual-enabled with appropriate hardware and Operating System (OS) support can appear as multiple, separate physical devices, each with its own PCIe configuration space.

In a general use case, the main processor 10 drives a Physical Function 30 and multiple Virtual Functions 21 over the PCIe link 40 to the security processor 50 for handling crypto requests aiming at providing cryptographic services to multiple customers; each a tenant on the HSM. This virtualization of hardware resources can lead to security breaches when multiple customers share them (e.g. exploit of eavesdropping, memory/cache 15/55 content, CPU micro-architectural optimization). In particular, the Peripheral component Interface exchange (PCIe) physical link between the main processor 10 and HSM concentrates all the exchanges, including the customers private data (e.g. cryptographic keys). In this disadvantaged arrangement, sensitive data may leak from the PCIe exchange, which may be detected by side channel analysis/attacks.

To mitigate this security concern, AES encryption is applied to data over the PCIe link 40. In this standard use case, as shown in FIG. 1, a general purpose HSM architecture employs a single AES hardware block 12 on MP 10 (also replicated AES 52 on SP 50), whereby each Virtual Function shares the same AES session key 11. In this basic protection scheme, a same AES session key 11 is established between the main processor 10 and the security processor 50, which is then used to encrypt and decrypt all data under the same key. Although using a same AES session key 11 provides the benefit of avoiding data leakage from the PCIe link, there is a disadvantage. Large amounts of data are encrypted with the same key using a dual AES block implementation (one on main processor, and one on security processor), with one part of the link still in the clear on each processor; namely, the unprotected data lines 17 from the AES to each VF on MP 10, and the unprotected data lines 18 from/to the AES block and respective crypto units on SP 50. Moreover, if this shared AES session key 11 is compromised, all Virtual Functions 21 (and also the multiple tenant customer applications) are impacted and compromised from a security viewpoint.

To mitigate these security concerns, a different implementation is herein contemplated in accordance with the inventive embodiments, with the following properties, as described ahead: end-to-end Data Encryption, Virtual Function Diversification and even application sub-diversification) with a minimal key exchange (i.e. Boot Session Key only), Sensitive Data Storage, and Data Transfer Error Detection.

Figure 2:
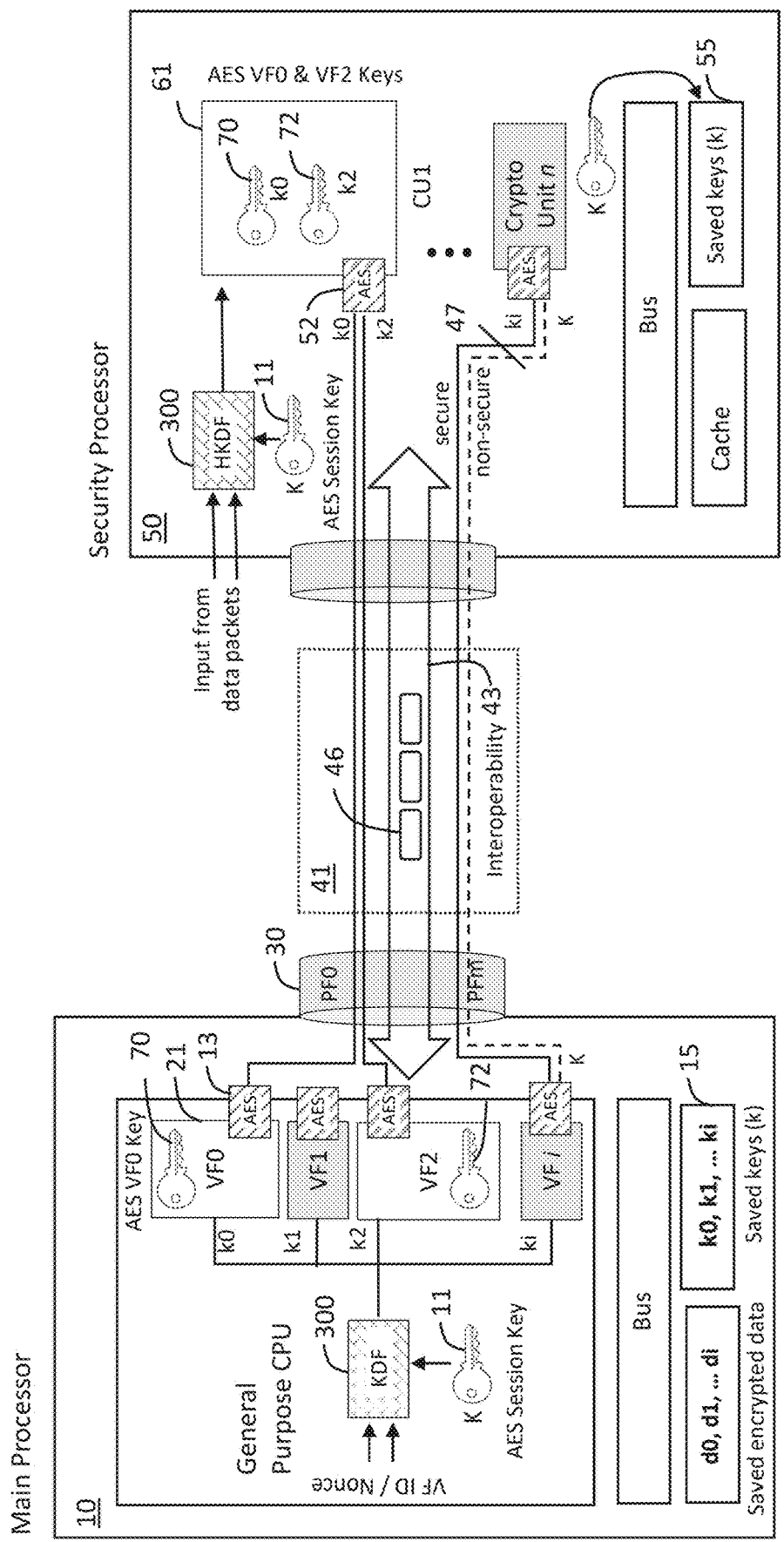
FIG. 2 illustrates an electronic hardware sub-system within a Hardware Security Module (HSM) suitable for use in securely servicing cryptographic requests from multiple tenant applications logically isolated thereon to preserve end-to-end privacy in accordance with an embodiment.

FIG. 2 illustrates an electronic hardware sub-system 200 within a Hardware Security Module (HSM) suitable for use in securely servicing cryptographic requests from multiple tenant applications thereon to preserve end-to-end privacy in accordance with an embodiment. The HSM handles cryptographic service requests for each tenant independently from the other. By way of the inventive aspects herein, the tenants are isolated from one another with improved side channel protection, whereby tenant applications on the same or different processors do not have access to another application's data, memory, processes or other sensitive information.

The sub-system system 200 further includes the addition of a Link Encryption and Key Diversification interoperability 43 between the MP 10 and SP 50, that by way of a HSM key diversification function (KDF) 300 provides cryptographic and logical isolation between multiple tenant applications on the HSM. An initial observation shows that the data lines (previously unprotected data lines 17/18 in FIG. 1) are now internally protected by way of an AES block assigned to each and every respective VF and CU. The data lines are encrypted and terminate into hardware. This provides for the property of hardware-based end-to-end encryption. This is one way in which customer privacy between tenants is guaranteed, such that sensitive data there between can be processed safely and securely by the respective crypto unit 60 hardware resources even if these same units are shared between customer applications.

The crypto units 60 are independent crypto hardware accelerators responsible for Public Key Hardware Accelerators (PKHA) to support the various key lengths and routines required by the HSM; including, but not limited to, Elliptic Curve Cryptography (ECC) over prime and binary fields, DSA signing, DSA verification, Modular operations (add, subtract, multiply, exponentiation, reduction, inversion, point add, point multiply, Montgomery ladder operations, divisor and primality tests, Random Number Generation (RNG), Advanced Encryption Standard algorithms, and digest operations (hashes, SHA, MD5, HMAC, etc.).

Although not shown, the security processor 50 may include job queue and descriptor controllers to the respective Crypto Units 60, along with typical System on a Chip (SoC) functions/hardware: including, but not limited to, memory 55, DDR, SRAM, L1/L2 Cache, Flash, and multiple Ethernet physical ports. Descriptors are added to differentiate secure and non-secure data, which allows for latency reduction by only encrypting keys/sensitive data, and allows for storage of encrypted key on the main processor 10. In one embodiment as a SoC, the security processor 50 is an integrated circuit (IC) that takes a single platform and integrates an entire electronic or computer system for crypto algorithms and operations onto it. The modules for providing Link Encryption and Key Diversification interoperability 43 may also be SoC components The Link Encryption and Key Diversification interoperability 43 between the MP 10 and SP 50 provides cryptographic and logical isolation between multiple tenant applications on the HSM individually using and sharing said more than one PCIe PF 30 over said more than one Virtual Function (VF) 21 to the one or more Crypto Units (CU) 60 for satisfying a request 46 of said cryptographic services. As noted ahead, the requests 46 may be in the form of packets communicated between the main processor 10 and security processor 50. The main processor 10 may also include a bus, a memory 15, and a cache for storing encryption data, sensitive information, or keys. Notably, the encrypted data (d0, d1 . . . di) can be saved in memory on the main processor 10. Similarly, the security processor 50 includes a bus, a memory 55, and a cache for storing encryption data, sensitive information, or keys as shared or independent components.

Figure 3:
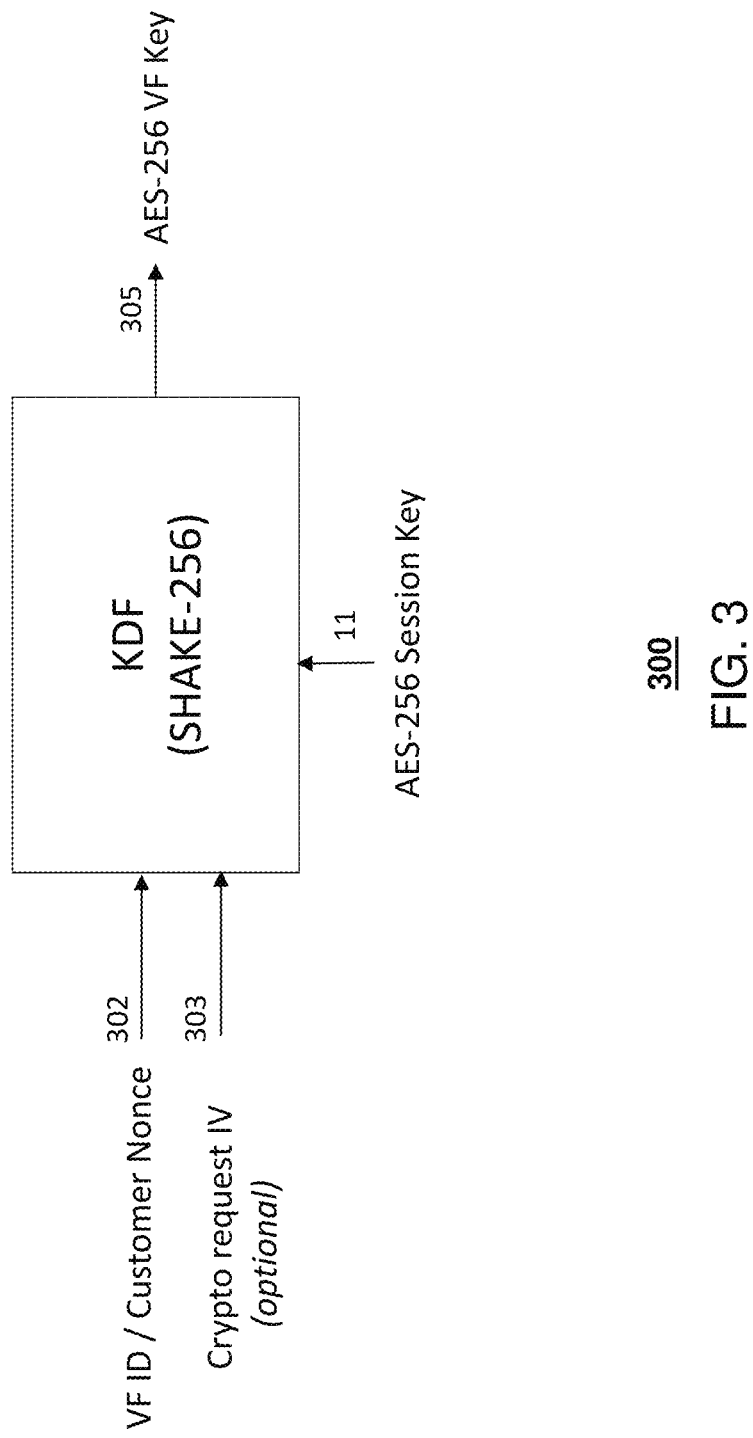
FIG. 3 is a block diagram of a HSM Key Diversification Function (KDF) to provide Link Encryption and Key Diversification interoperability across the PCIe channel in accordance with an embodiment.

FIG. 3 is a block diagram of a HSM Key Diversification Function (KDF) 300 to support the Link Encryption and Key Diversification interoperability 43 across the PCIe channels 41 in accordance with one embodiment. The KDF 300 receives as input parameters: an AES-256 Session Key 11; a Virtual Function (VF) Identifier (ID) or Customer Nonce 302; and a Crypto-request Initialization Vector (IV) 303. The AES-256 Session Key 11 is computed between the MP 10 and SP 50 at every Power-On-Reset or upon Firmware request. IV stands for initialization vector and is a specific way in which block encryption algorithms are salted; namely, the IV is a random first block that is used to initialize the feedback register of the encryption algorithm. The Nonce is an abbreviation for "number used once", and it is a random number used only once. The Nonce is a N-bit field subject to adjustment for ensuring validity to use in hashing a block's value. The nonce is used on authentication protocols and cryptographic hash functions.

The KDF 300 produces as output: an AES-256 VF Key 305 specific to a particular VF of the more than one Virtual Function (VF) available on the MP 10. The AES-256 VF Key 305 is distinct from the general use AES-256 Session Key 11. The AES-256 VF Key 305 is used to securely encrypt and decrypt data transmitted over the PCIe communication channels 41 created between the MP 10 and the SP 50 over a particular PF terminating on a CU. That is, each AES-256 VF key provides hardware-based end-to-end encryption between a respective VF and CU. The AES-256 VF key is used for decrypting incoming 'sensitive data' within the request (e.g. PQC secret keys), and encrypting outgoing 'sensitive data' in the request answer (e.g. RSA keys). In one arrangement the KDF 300 implements the SHAKE-256 as the underlying hash function to benefit from post-quantum crypto accelerator hardware.

The diverisification principle of the KDF 300 is that once the SP 50 receives a request 46 (e.g., via a packet message), it analyzes the "VF" number field, and then the respective crypto unit (CU) 60/61 checks in "VF key cache" if the AES-256 VF decryption key is available from memory 55, otherwise, the respective KDF (on the security processor 50) generates the AES-256 VF key. Each respective AES-256 VF Key can be saved in memory 55 on the security processor 50. Also seen in this figure is the notion of a secure channel and a non-secure channel 47, described ahead.

Referring briefly back to FIG. 2, an KDF hardware block 300 exists on both the main processor 10 and the security processor 50. That is, the MP 10 includes its own KDF 300 to produce an AES-256 VF Key 70 specific to each particular VF thereon. Each virtual function also has its own AES block, for example VF0 includes AES 13. Here we also see AES-256 VF Key 70 is associated with VF0 21 on MP 10 with its own AES block 13, and AES-256 VF Key 72 is associated with VF2 on MP 10 with its own AES block. The MP 10 encrypts outgoing sensitive data to the SP 50 within the request 46 for said cryptographic services using the AES-256 VF Key 70 across a secure PCIe channel 41 to CU1 61, and using the AES-256 VF Key 72 across a different secure PCIe channel 41 to the same CU1 61.

Similarly, the SP 50 includes its own KDF 300 to produce the same said AES-256 VF Key specific to the respective particular VF of said MP 10. Notably, each CU (e.g. 61) also includes its own AES block (e.g. 52). The SP 50 decrypts incoming sensitive data from the MP 10 within the request 46 for said cryptographic services of CU1 61 using the respective AES-256 VF Key 70/72. Here, on the SP 50 side, we see AES-256 VF Key 70 is associated with CU1 61 and its AES block 52, and also AES-256 VF Key 72 is associated with CU1 61 with that same AES block 52. That is, each virtual function (e.g., VF0 and VF2) to a same hardware resource (e.g. CU1 61) has its own key (e.g. k0, k2) to be used with the same AES block 52 for that hardware unit (e.g. CU1 61) over their own respective independent secure PCIe channel 41. Thus, an isolated PCIe communication channel is thus created for each particular VF to its respective CU and is secured by using AES 256 block 52 encryption with the respective AES-256 VF Key, either derived by way of the KDF using said input parameters, or pulled from memory 55.

Figure 4:
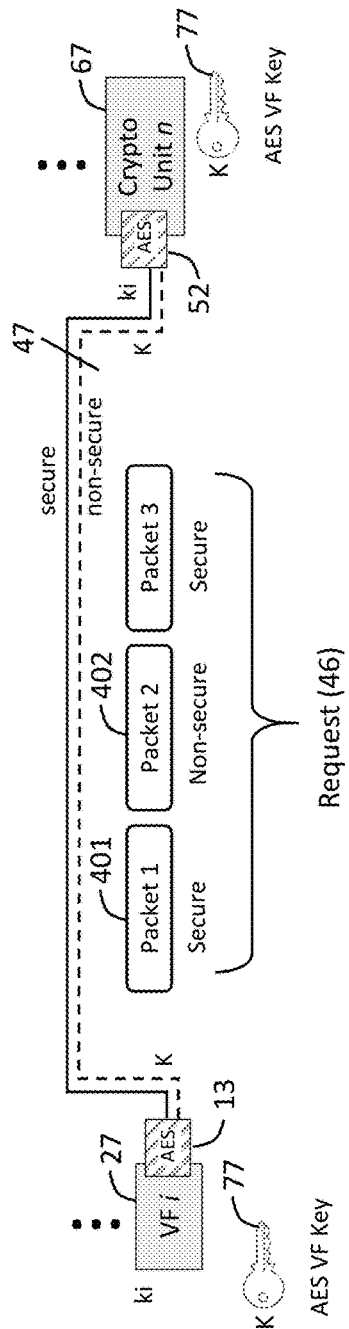
FIG. 4 illustrates a mixing of secure and non-secure packets across the PCIe channel in accordance with one embodiment.

FIG. 4 illustrates a mixing of secure 401 and non-secure 402 packets across the PCIe channel 41 in accordance with one embodiment. For link encryption and key diversification interoperability on the SP 50, once the request 46 for cryptographic services is received, a VF number field for the particular VF 27 is analyzed in the request 46, and an identified Crypto Unit (CU) 67 is designated to: check in a VF Key Cache if the AES-256 VF Key 77 is available for that CU, otherwise, generate the AES-256 VF Key 77 by way of the KDF 300 on the SP 50 for that CU 67; and use the AES-256 VF Key 77 for securely encrypting and decrypting data across the PCIe communication channel 41. The request comprises a mix of secure and non-secure data, and a packet header (401) for the request (46) indicates which data are encrypted and not encrypted with a respective AES-256 VF Key (70), so that the identified Crypto Unit will respectively decrypt and not decrypt the data received with that respective AES-256 VF Key (70).

Herein, the contemplated secure PCIe 'channel representation' is an abstracted point of view. In practice, it means that General Processor (GP) CPU of MP 10 will be able to mix secure and non-secure data within the same request. In the header of the packet, the GP CPU will indicate which data are encrypted or not so that the Crypto Unit will respectively decrypt or not the received data. For example: suppose the GP CPU wants to get the RSA signature of a given Message. Message M and RSA modulus N can be considered Non-secure data and RSA Secret key (s) can be considered a secure asset. Hence the request send by the GP CPU will contain [EncFlag=0–M||EncFlag=0–N||EncFlag=1–Enc(s)] where || stands for concatenation. So, it will not use different channels properly speaking but rather mix encrypted data with plaintext data.

One advantage of having a secure PCIe channel per virtual function (VF) is that it does not compromise the security of the PCIe channels for the other virtual functions. It does not compromise the entire system. In this way it provides for logical isolation between two virtual functions sharing the same hardware; namely a crypto unit (CU). Key diversification allows for the creating of a secure channel per virtual function/application. It can be mixed with non-secure channel for performance optimization as shown in FIG. 4. For example, computation and power consumption for certain crypto command requests (e.g. signing, verification, etc.) may be assessed as parameters on the non-secure channel and compared to corresponding parameters on the secure channel to optimize data loads and respective data encryption performance.

In another arrangement, the AES block 52 implementation can be customized to resist side channel analysis/attacks (SCA) by controlling the logical isolation, for example, by altering the transmission sequence of packets (e.g. secure vs non-secure), data loading, and delivery schedule of packets from each VF to a respective Crypto Unit (CU). Other advantages include: i) Flexibility in that encryption can be activated per VF/Application/Data, ii) Efficiency to minimize bandwidth loss (e.g. RSA-CRT 2k Signature), iii) Security with respect to information leakage cancelling on General Purpose CPU and PCI link, and iv) Future-proofness in anticipation of certification requirements with respect to Side-Channel Security, whereby Key Establishment can be modified for post-quantum crypto via move to key encapsulation mechanisms (KEM).

Figure 5:
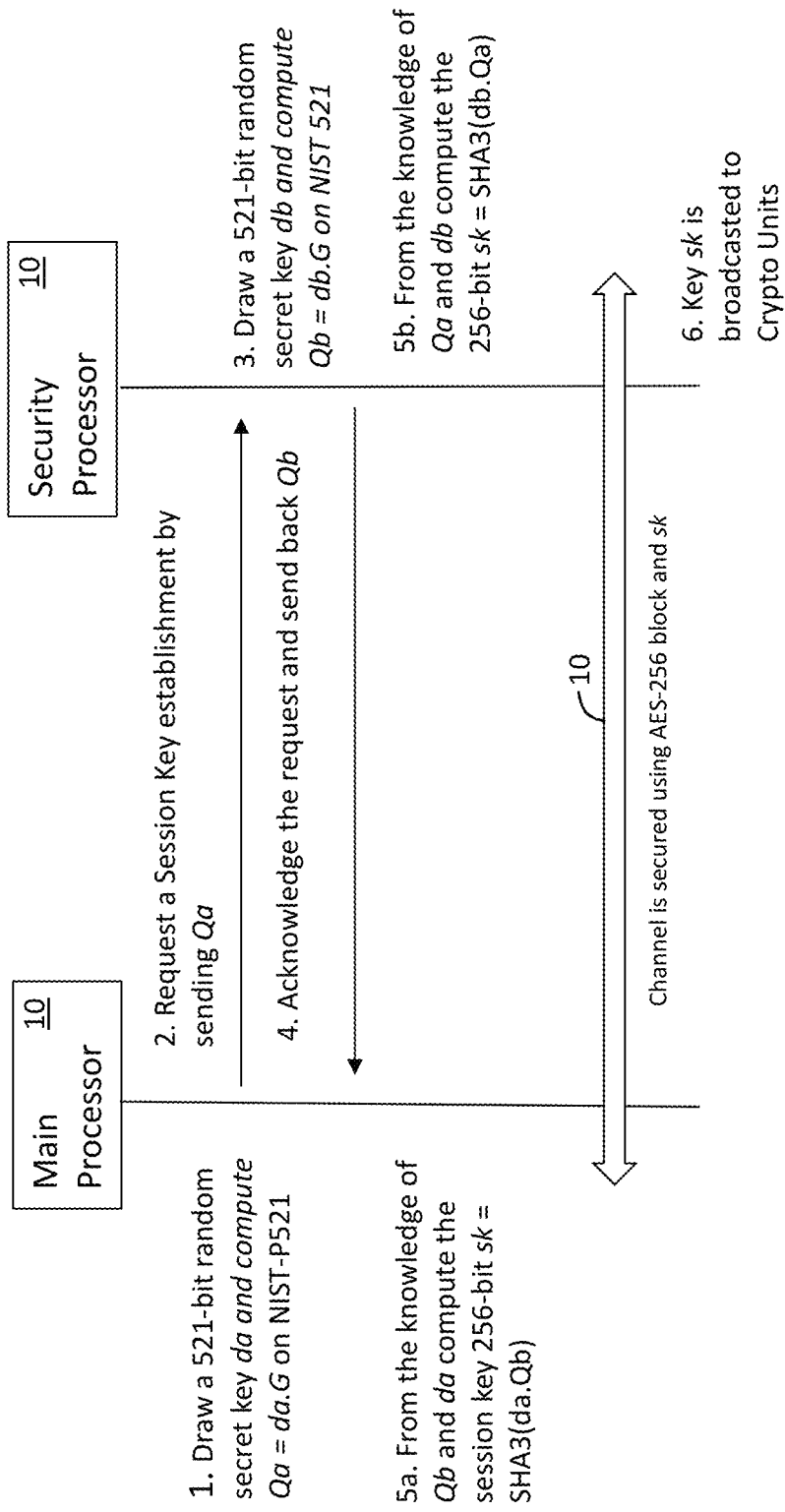
FIG. 5 depicts a flowchart for key session establishment to secure the PCIe channel in accordance with the embodiments.

FIG. 5 depicts a flowchart of a method 500 for key session establishment to secure the PCIe channel 41 in accordance with the embodiments. Briefly, this method 500 applies to generation of the AES-256 Session Key on the MP 10 and SP 50 for general PCIe encryption (see FIG. 1). This AES AES-256 Session Key is then used by the KDF 300 to produce each respective AES-256 VF Key for each VF and its respective Crypto Unit (see FIG. 2) to secure its own link over the PCIe channel 41.

As shown in FIG. 5, the AES-256 Session Key 11 is created by an ECDH Key exchange using the NIST P521 curve, wherein by way of the MP 10, the ECDH Key exchange is i) negotiated between one or more Central Processing Units (CPU) of the MP 10, and the SP 50, thereby producing an ECDH key; and ii) the AES-256 Session Key 11 is obtained by a Hash (SHA3) of the ECDH key. At step 1, the MP 10 draws/produces a 521-bit random secret key da and compute Qa=da.G on NIST-P521. At step 2, it requests a Session Key establishment by sending Qa to SP 50. Similarly, at step 3, the SP 50 draws/produces a 521-bit random secret key db and compute Qb=db.G on NIST 521. At step 4, SP 50 acknowledges the request and sends back Qb. Steps 5a and 5b are concurrent. At step Sa, MP 10 computes the session key 256-bit sk=SHA3([da.Qb]) from the knowledge of Qb and da along with its own calculations. At step 5b, SP 50 computes the 256-bit sk=SHA3([db.Qa]) from knowledge of Qa and db along with its own calculations. Thereafter the general PCIe channel 41 between the MP 10 and SP 50 is secured with sk (i.e. AES-256 Session Key). At step 6, the SP 50 broadcasts the sk (i.e. AES-256 Session Key) to each crypto-unit (CU) which is stored for local use with its respective AES block. This ends method 500.

This AES AES-256 Session Key is then used by the KDF 300 to produce each respective AES-256 VF Key for each VF and its respective Crypto Unit (see FIG. 2) to secure its own link over the PCIe channel 41. Thereafter, when a tenantapplication requires cryptographic services, that link will be secured using the AES-256 block with its respective AES-256 VF Key. This occurs for the securing of each VF/PF Ethernet port assigned to a tenant application.

Alternate Embodiment

Figure 6:
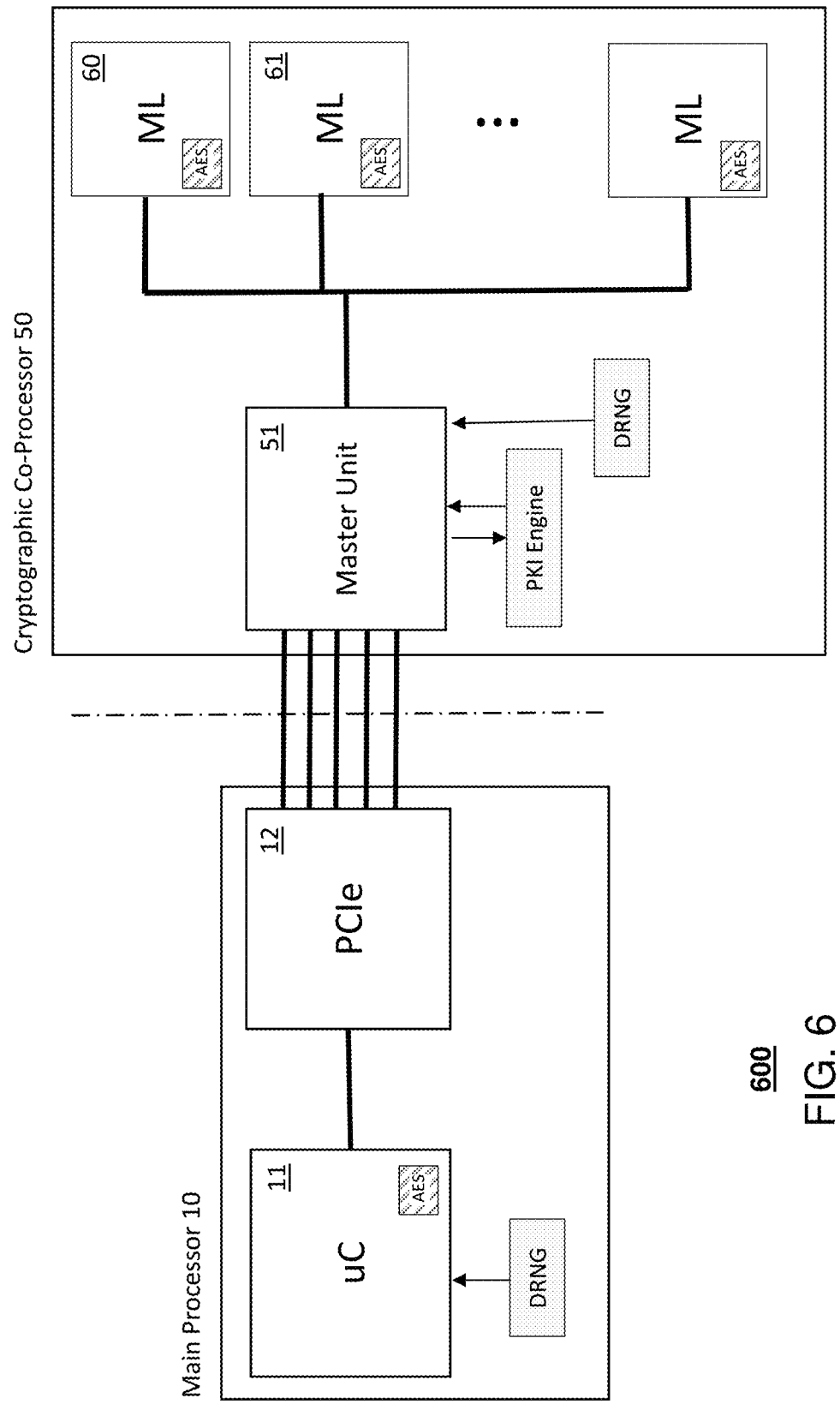
FIG. 6 depicts an electronic hardware sub-system within a Hardware Security Module (HSM) suitable for use in securely servicing cryptographic requests from multiple tenant applications logically isolated thereon to preserve end-to-end privacy by way of a Master Unit and Montogomery Layers (ML) in accordance with an embodiment.

FIG. 6 depicts an electronic hardware sub-system 600 within a Hardware Security Module (HSM) suitable for use in securely servicing cryptographic requests from multiple tenant applications logically isolated thereon to preserve end-to-end privacy by way of a master unit (MU) and Montgomery Layers (ML). Here, the main processor 10 includes a micro-controller (uC) 11 with a digital random number generator (DRNG). The security processor 50 is a cryptogaphic processor comprising the Master Unit (MU) 51 with its own PKI engine and DRNG. Here, each crypto unit (CU0 60, CU1 61 . . . ) can be expressed as a Montgomery Layers. Briefly, a Montgomery Layer is an implementation of a cryptographic unit mainly dedicated at accelerating modular arithmetics. The Montgomery Layer is reportedly resistant against simple Side Channel Attacks (SCA) and Timing Attacks (TA) as it implements data independent version of various cryptographic public key algorithms.

As depicted, PCI encryption link 12 will be supported by AES algorithm with 256-bit keys. The AES key is a session key computed at every Power-On-Reset or upon Firmware request (e.g. in case of corruption) using an Elliptic Curve Diffie-Helmann key exchange protocol. In order to preserve data confidentiality from end-to-end of the link, data are encrypted on Host side and decrypted by Montgomery Layers using AES CPU coprocessor CP2. The Host can even store sensitive data encrypted in Non-Volatile Memory. The Key exchange (see also method 500 of FIG. 5) is computed with ECDH and NIST P521 curve, AES 256-bit key extracted from the Hash (e.g. SHA3) of the ECDH common key. The Session key is negotiated by Master Unit 51 and Host 10 at every Power on Reset (PoR) and upon a Master Unit 51 MailBox request.

Additional implementation details of on the ECDH exchange procedure include:
Qa and Qb are both ECC points over curve P-521,
X and Y coordinates of Qa shall be 72-byte long padded with 0 x00 on MSBs with words in Big Endian format for both words and bytes namely:
W0=B0 B1 B2B3, W1, . . . , W17
Both parts computes a ECDH common key Qab=da.db.G and, after the computation, Host and MU shall erase/zeroize respectively (da, Qa) and (db, Qb),
32 bytes of SHA3 output over ECDH common key Qab are used to define the AES Session key and so to generate the CRC16-CCIT namely, using representation above B0 to B31.
Once CRC16-CCIT is generated MU makes the key available statically on a bus broadcasted to Montgomery Layers As depicted in FIG. 6, the MU 10 negotiate the AES session key whereas ML 60 uses it for decrypting incoming and encrypting outgoing data. Hence, the MU 60 shall broadcast the session key to MLs via a specific channel and additional CRC16-CCIT bits (i.e. 256+16 bits). The advantage of this method it that ML 60 can benefit from S8 CRC16 accelerator for fast integrity computation.

Referring back also to FIG. 3, the Key Derivation and Sensitive Data Encryption is reviewed in this alternate embodiment. Here again, the AES session key is not used to support PCI link encryption. Indeed, the PCI link is used by Physical/Virtual Functions (i.e. also denoted respectively as PF/VF) and it is important to provide logical isolation between sensitive data that are transferred through the link. Hence, each PF/VF will own a key—derived from the AES session key—to encrypt/decrypt sensitive data. The Key Derivation Function is implemented with SHAKE-256 described in FIPS-202 and using the VF number and the AES session key in input. The choice of SHAKE-256 is motivated by the support of KECCAK hardware acceleration provided by MLs. The use of a Nonce, in addition to VF number, allows a diversification per function. That way, for a given VF, it is possible to encrypt RSA keys and ECDSA keys differently, without considering IV (see Encryption Paragraph).

Each ML shall provide services to multiple VFs and so, shall handle multiple encryption keys. In order to avoid key derivation computation—and so reduce processing latency—a part of ML RAM may be reserved for caching the keys. The cache width is not defined yet but current best guess is to reserve 1 kBit (or four AES VF Keys). That way cache consistency will be ensure with BRO codes to detect any key integrity issue. Note that key cache shall be indexed by NONCE[18:11] || VF Number[10:4] recovered from the request header.

One of the aforementioned properties of the inventive aspects is data transfer error detection. As previously mentioned, sensitive data to transfer within the request 46 will be encrypted using AES and a 256-bit VF key that derivate from a session key. Note that both Host and ML are subject to encrypt data. The figures below (FIG. 7A and FIG. 7B) describe a way to encrypt/decrypt sensitive data using AES in OFB mode (Output Feedback). Note that, for integrity detection purpose, the CRC16-CCIT of the plaintext is computed before encrypting. The CRC of encrypted data is sent in plaintext together with data within request. Accordingly, as a further check, the MP 10 provides data transfer error detection of data transmitted across the PCIe communication channel 41 via Cyclic Redundancy Check (CRC) computation (see 700 FIG. 7A) and CRC decryption (see 750 FIG. 7B).

To encrypt sensitive data with this additional CRC checking mechanism, the following method steps are performed:
Step 1: Compute CRC on plaintext data Dcrc.
Step 2: Compute VF AES-256 key using VF Number and AES-256 session Key.
Step 3: Encrypt Data in AES-256 OFB Mode as shown by OFB encryption 700 in FIG. 7A.
Step 4: Store the Encrypted data+Clear CRC in non-vlatile memory (e.g., memory 15).

Figure 7A:
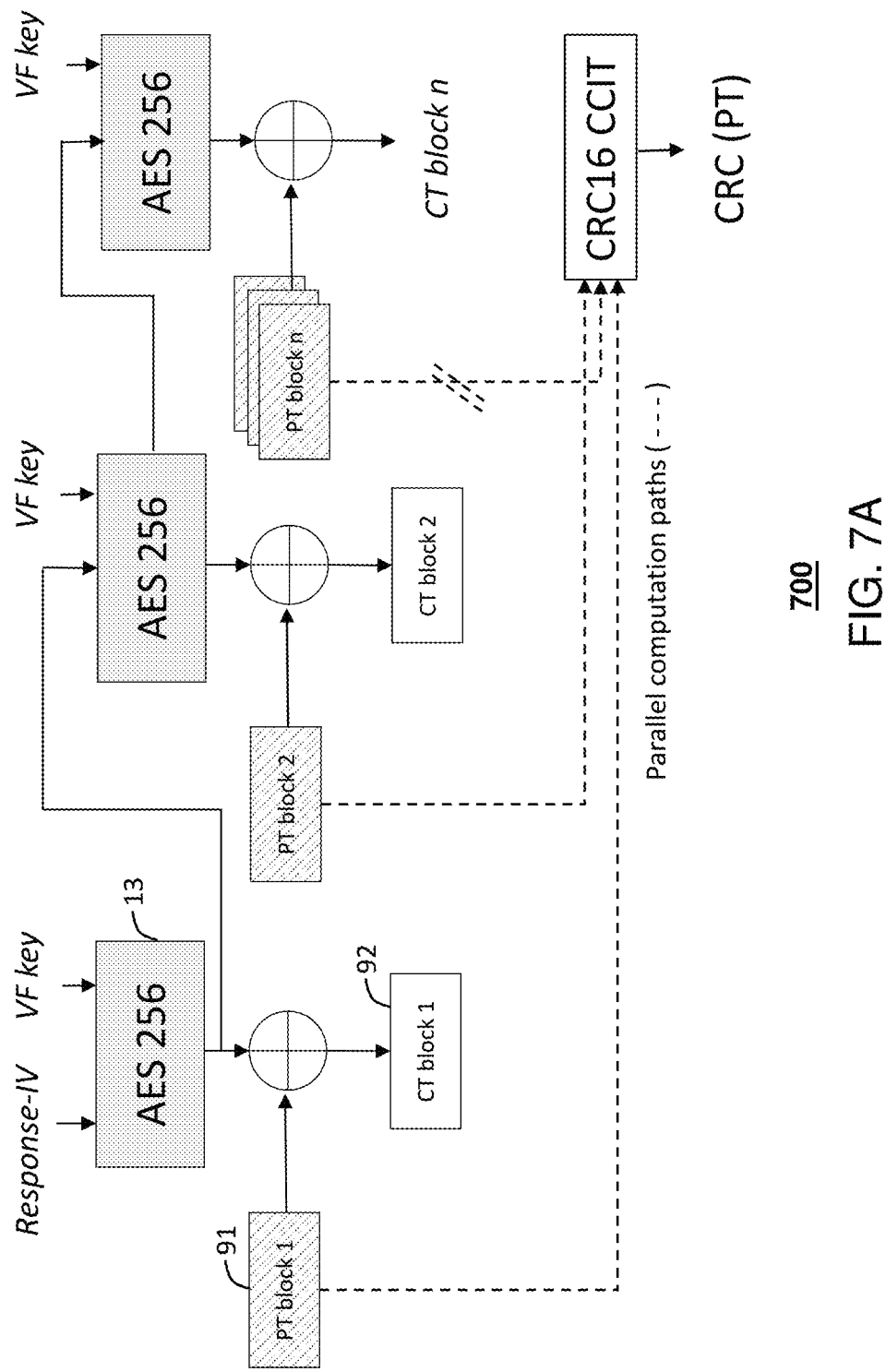
FIG. 7A depicts a scheme Output Feedback (OFB) block encryption via the main processor in accordance with the embodiments.

FIG. 7A depicts the scheme for Cyclic Redundancy Check (CRC) OFB encryption 700 via the main processor in accordance with the embodiments. This scheme encrypts plaintext data in AES-256 Output Feedback (OFB) Mode using as input parameter Initialization Vector (Param-IV) to produce encrypted data. It employs Output Feedback (OFB) mode as a block cipher mode of operation using a block cipher algorithm. In OFB, the output of the encryption function is fed back to the shift register in OFB in the cryptography. This is different from CFB in the mode of blocks, where the ciphertext unit is fed back to the shift register in the block. As shown, the input to the OFB encryption AES-256 13 block includes the Response IV and the VF Key which is then combined (e.g., exclusive or) with the plain text (PT) block 91. This stage produces as output the cipher text (CT) block 92. The output of the AES-256 13 block is then provided as input to the next stage, which similarly employs the VF key. Each respective stage receives as input the corresponding plain text (PT) block (e.g., PT block 2, PT block 3 . . . ), and outputs a cipher text block (e.g., CT block 2, CT block 3 . . . ). The resulting CT blocks are concatenated and then transmitted as encrypted cipher text. Also seen are the dotted lines for the parallel CRC computation paths. Here, we see a CRC is performed in parallel each time with an OFB encryption block which all terminate as inputs in the CRC16 CCIT, which produces as output the CRC for the plain text (PT).

In addition to the key, OFB Mode requires a 128-bit Initialization Vector (or IV) that allows diversification per request, even for a given VF. For a request, the encryption is computed by Host. Hence the IV is drawn by Host and copied in a reserved field of the request containing sensitive data to protect. Then ML decrypts data using request information (i.e. VF NUM, Nonce, IV) for AES and completes with an integrity check by comparing the decrypted text CRC to data header CRC. Note that Host can store encrypted data in Non-Volatile memory for later re-use.

For an answer to a request 46, the ML encrypts the data that are sent back. In this case, the IV to be used is not drawn by ML but an IV sent in the 'response-IV' field of the request. Note that multiple data can be encrypted in response so, to simplify the scheme, all data may be encrypted/CRC computed in a contiguous way. As for request, answer CRC is sent in plaintext. Afterwards, the Host decrypts, checks CRC and splits data for later re-use (e.g. typical case is Cryptographic Key Generation).

To decrypt sensitive data, the following method steps are performed in view of the additional CRC checking mechanism:

Step 1: Recover CRC Dcrc from Descriptor Field.
Step 2: Recover VF Number and compute VF AES-256 key (or get it from key cache 55).
Step 3: Decrypt data in AES-256 OFB Mode as shown by OFB decryption 750 in FIG. 7B.
Step 4: Check CRC on Decrypted Data and compare to Dcrc. If the comparison is correct the data is correctly decrypted.

Figure 7B:
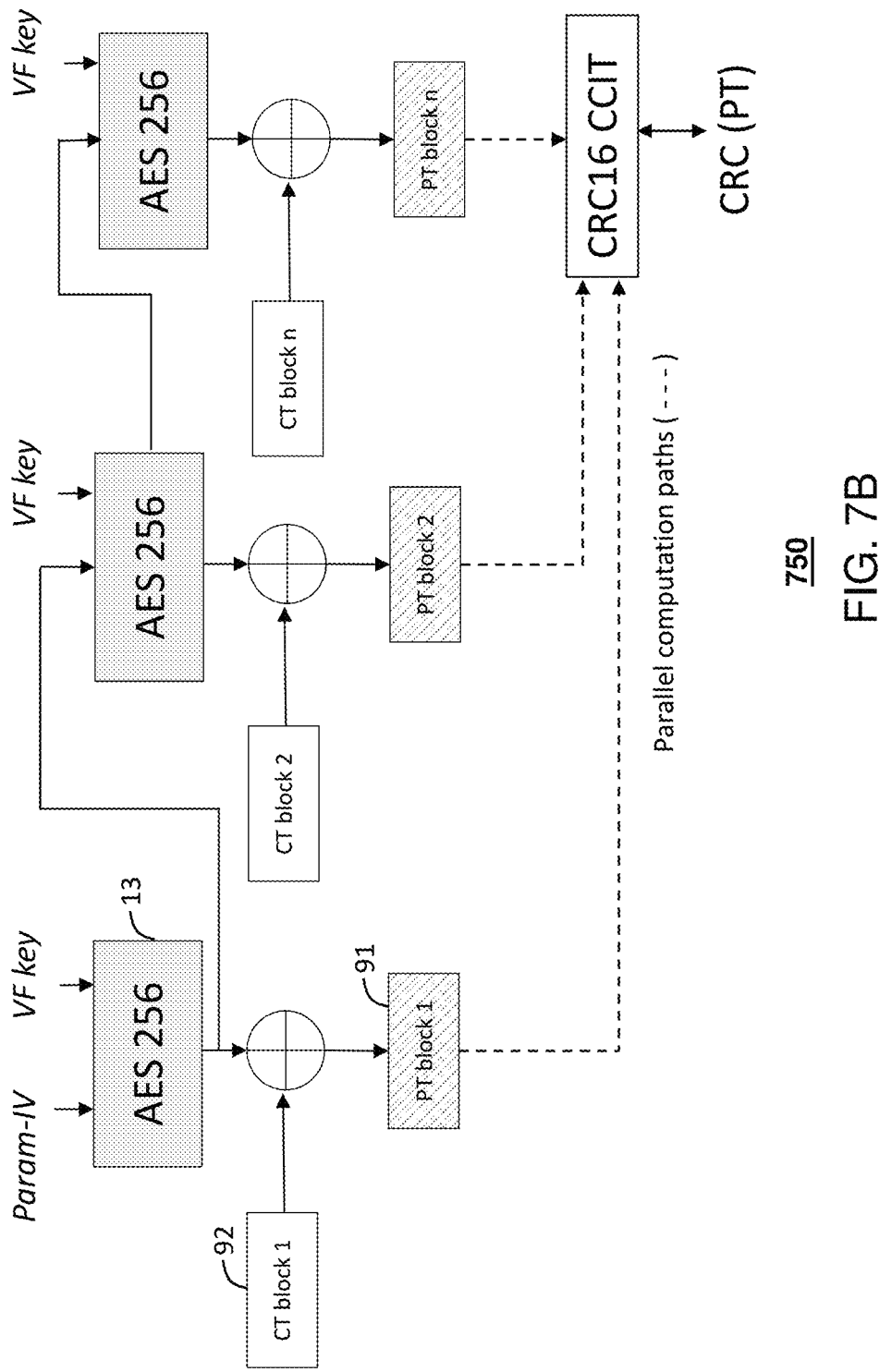
FIG. 7B depicts a scheme Output Feedback (OFB) block decryption via the main processor in accordance with the embodiments.

FIG. 7B depicts a scheme for Cyclic Redundancy Check (CRC) OFB decryption 750 via the main processor in accordance with the embodiments. This scheme decrypts the encrypted data in AES-256 Output Feedback (OFB) Mode using as input Response Initialization Vector (Resp-IV). It is essentially the inverse of the OFB encryption 700 and using a similar block lattice structure, but where the CT block is switched for the PT block for each respective stage. Here, the input to the AES 256 13 is the parameter IV vector (e.g. the CT output block of 700) and the corresponding VF key. The output of the encryption AES-256 13 block is then combined (e.g., exclusive or) with the cipher text (CT) block 92. This stage produces as output the plaint text (PT) block 91. The output of the AES-256 13 block is then provided as input to the next stage, which similarly employs the VF key. Each respective stage receives as input the corresponding cipher text (CT) block (e.g., CT block 1, CT block 2, CT block 3 . . . ), and outputs a pain text block (e.g., PT block 1, PT block 2, PT block 3 . . . ). The resulting PT blocks are concatenated and then transmitted as block plain text. Also seen are the dotted lines for the parallel CRC computation paths. Here, we see a CRC is performed in parallel each time with an OFB decryption block which all terminate as inputs in the CRC1-6 CCIT, which produces as output the CRC for the plain text (PT). This should match the CRC output in FIG. 7A.

Figure 8:
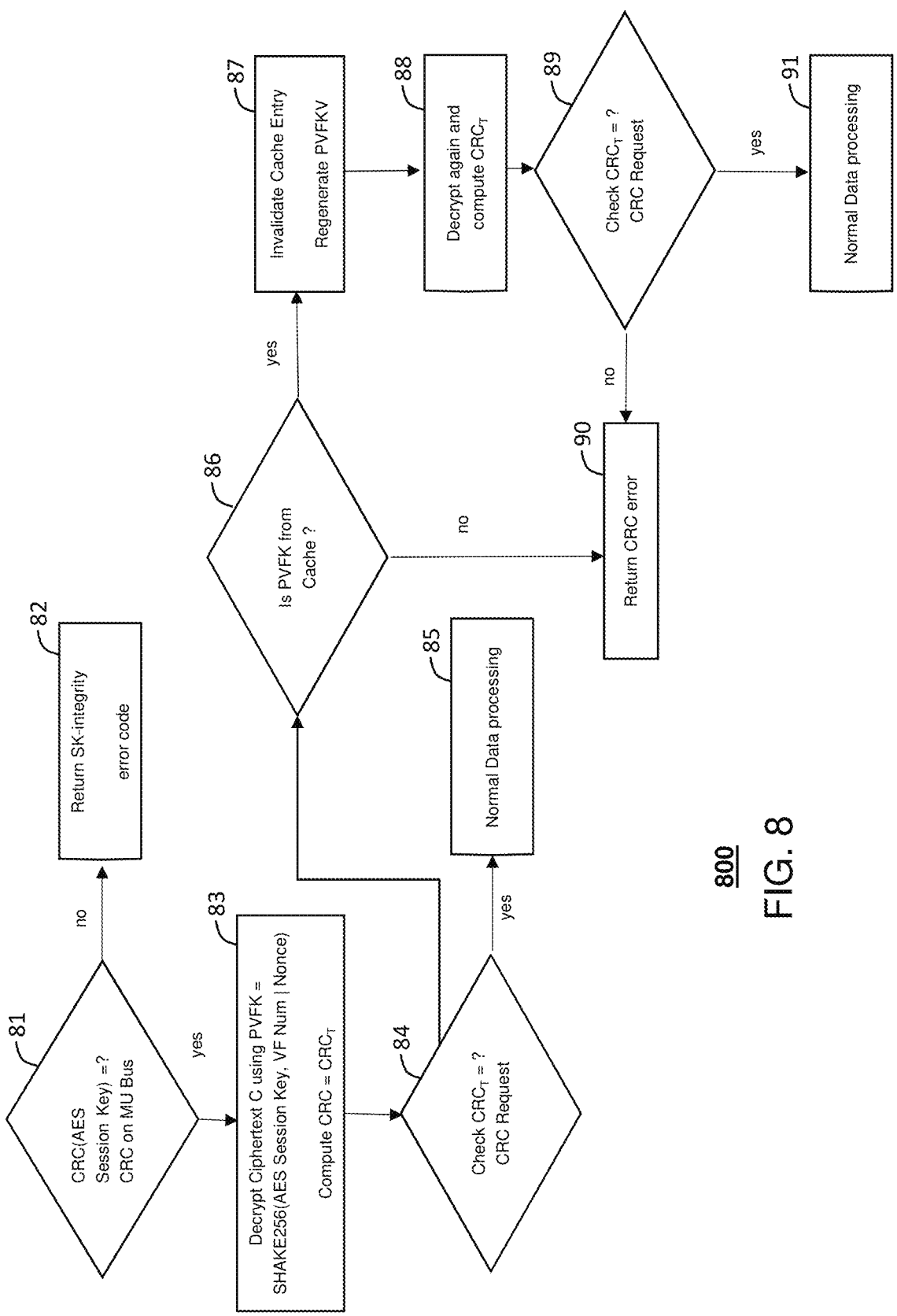
FIG. 8 depicts a flowchart 800 for how a ML as a crypto unit will manage error detection through CRC check.

In order for a request to be correctly processed/acknowledged by Master Unit or Montgomery Layers, the request data shall satisfy integrity check. For sensitive data, it implies making sure that encryption is robust as well since integrity check is done on decrypted data. Therefore, error management shall involve integrity check on all parameters involved in encryption. These contributors are listed below in usage order:

AES 256-bit Session Key
    Static Broadcast on ML to MU,
    Integrity Protected by CRC16-CCIT on MU Bus to ML.
AES PF-VF Key
    Based on PF-VF Number and Nonce received in the request,
    Recovered from Key Cache (in RAM) or,
    Computed from SHAKE-256.
128-bit Initialization Vector
    Generated by Host for a request or,
    For preparing incoming data from ML,
    Integrity covered by Plaintext CRC sent in the request or,
    Computed from ML for incoming data.
Sensitive Data
    Integrity covered by Plaintext CRC sent in the request Integrity errors on sensitive data may have multiple explanation due to the multiplicity of data/mechanisms involved. FIG. 8 depicts a flowchart of a method 800 for how a ML as a crypto unit will manage error detection through CRC check. The method 800 may be practiced by more or less than the number of steps shown, and implemented by one or more of the aforementioned processors on the HSM. The method 800 can start at step 81, wherein a determination is made for CRC(AES Session Key)=? CRC on MU Bus. If no, an SK-integrity key error code is returned at step 82. If yes, at step 83, the Ciphertext C is decrypted using PVFK=SHAKE256 (AES Session Key, VF Num I Nonce) and then CRC=$CRC_T$ is computed. At step 84, Check $CRC_T$=? CRC Request, and if the resulting check is yes, then it proceeds to normal data processing at step 85. Otherwise, if the check does not match, a determination is made whether PVKF is from cache at step 86. If it is not in cache, the CRC error code is returned at step 90. Otherwise, if yes, the Cache Entry is invalidated and the PVFKV is regenerated at step 87. At step 88, the data is decrypted again and the $CRC_T$ is computed. At step 89, a determination for Check $CRC_T$=? CRC Request is made. If the check does not match, the CRC error code is returned at step 90. If the check is a match, then it proceeds to normal data processing at step 91.

Figure 9:
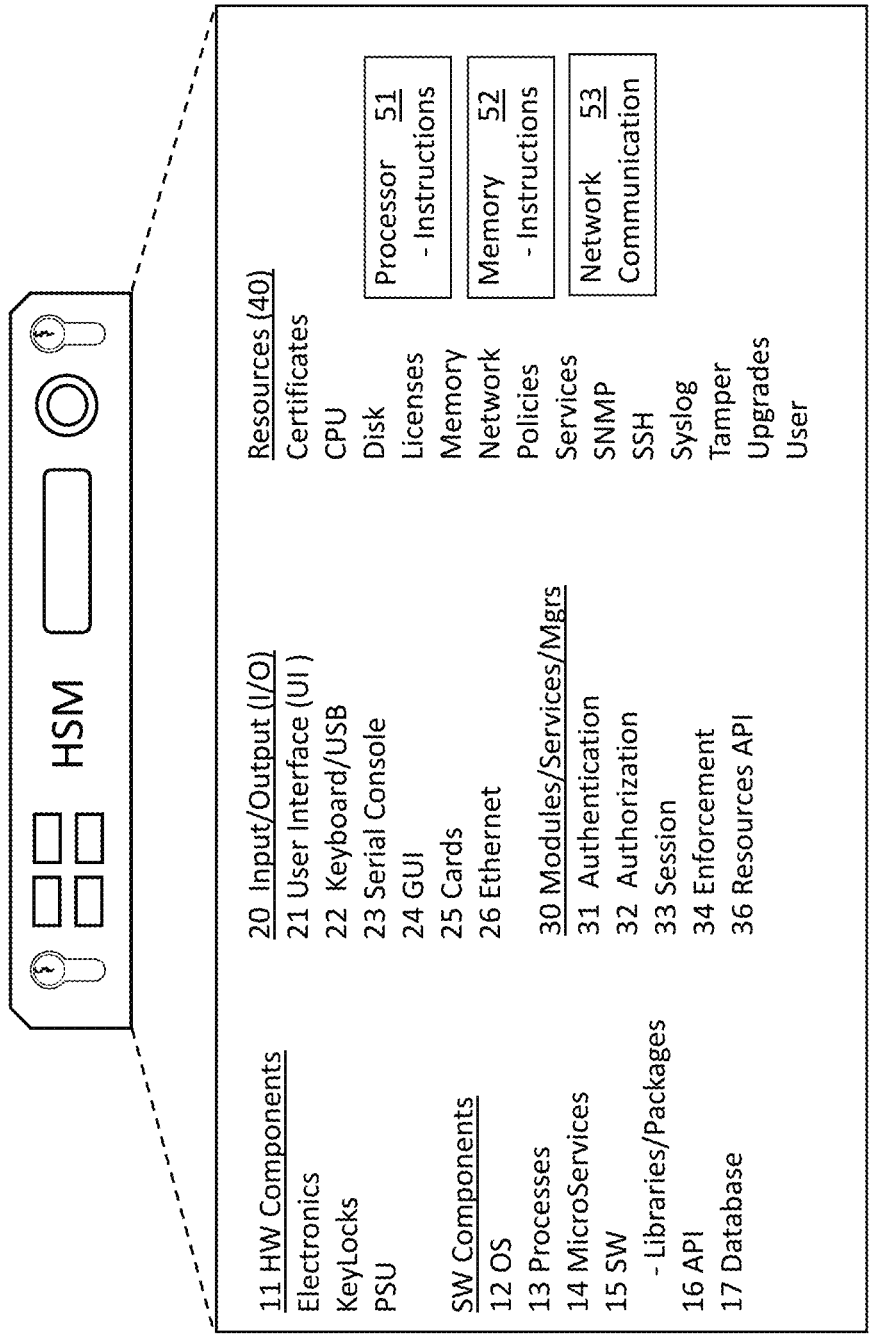
FIG. 9 depicts exemplary components of a Hardware Server Module (HSM) in accordance with one embodiment.

FIG. 9 depicts exemplary components of a Hardware Server Module (HSM) 900 in accordance with one embodiment. The HSM 900 is a physical computing device that, among other capabilities, safeguards and manages digital keys, performs encryption and decryption functions for digital signatures, and provides for strong authentication and other cryptographic functions. As a security hardened unit, the HSM 900 records tamper evidence, such as visible signs of tampering or logging and alerting, and provides for tamper responsiveness such as deleting keys upon tamper detection. The HSM 900 contains one or more secure cryptoprocessor and sensor chips to prevent tampering and bus probing, or a combination of chips in a module that is protected by the tamper evident, tamper resistant, or tamper responsive packaging.

The HSM 900 is in effect a computer system comprising one or more processors 51 and memory 52 coupled to the one or more processors, wherein the memory 52 includes computer instructions which when executed by the one or more processors causes the one or more processors to perform the operations of the methods described herein. The HSM may be connected over the network to other machines via the network communication device interface 53. In a networked deployment, the machine may operate in the capacity of a server or a client user machine in server-client user network environment, or as a peer machine in a peer-to-peer, or distributed, network environment.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the machine-readable memory 52 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

Other Embodiments

Operational use of the (GP or Payment) HSM 900 for establishing an End to End (E2E) trusted HSM setup using the methods described above is primarily by way of the components shown in the figures, but understandably, many more components, electronics, and modules are present in a typical HSM. Those components shown are those mostly related, and suitable for use, for implementing the foregoing inventive methods. Hardware (HW) components 11 represent general electronics for operating the HSM (e.g., processors, central processing units, security, sensors, memory, network devices, ports, power supply units (PSU), wires, keylocks, etc.). The Hardware also contains memory to run operating system and input-output (I/O) devices for interaction. It comprises different types of processors, such as a crypto processor, security processor, general processing unit (GPU), central processing unit (CPU) to assist in protection, management of keys and hardware acceleration with the operating system. The keys, or any other data, can be stored in the database for persistence. The hardware architecture is designed to protect and manage digital keys, and can perform encryption, decryption, digital signature generation and verification.

In one embodiment, the aforementioned (GP or Payment) HSM 900 functionality and methods for the End to End (E2E) trusted HSM setup is configurable as a micro-service. The customer configuration file is exposed via a micro-services API for End to End (E2E) trusted HSM setup using the trusted device. Micro-services are independent and lightweight processes designed to perform specific tasks. They are typically handled and managed within the HSM by way of the OS 12. Micro-services 14 can communicate with each other and with external systems over specialized protocols and application programming interface (API) 16. Micro service are built using software libraries/packages 15, which are a self-contained set of independent and interchangeable software component that implement a specific functionality. Micro-services 14 and Processes 13 are built using these software libraries/packages 15. By way of these microservices, applications can implement a third-party Microservice provider's generic API to a service to deliver Payment HSM capabilities. In this manner, for example, a $3^{rd}$ party customer by way of APIs can partition their workload to optimized payment HSMs for performing specific tasks (e.g. ECC/RSA key gen, PIN translations, etc.) according to their microservice model. As another example, a micro-service with a customer facing API for an End to End (E2E) trusted HSM setup using the trusted device is contemplated. The API can include options allowing the customer to configure trust anchors and certificate chain management for generating and programming the secure content (e.g. IP addresses for network configuration setup) on their workstations and HSM cluster within the protected environment.

The Operating System (OS) 12 is a software component that executes on top of hardware, for example, the general processor, to manage hardware resources and peripherals, run HSM jobs/processes, and help in execution of other processes 13. Ubuntu is an exemplary OS that provides an embedded Linux distribution with libraries and packages. Ubuntu (GNU/Linux) is a multitasking Operating System capable of executing several processes (tasks) simultaneously. Different processes 13 for performing the HSM functions (data protection, key management, pin translations, etc.) are scheduled by the operating system 12. A thread is the basic unit to which the operating system allocates processor time. A process 13 is an instance of a computer program that is executed by one or many threads in the GPU or CPU. One or more threads run in the context of the process. A thread can execute any part of the process code, including parts currently being executed by another thread.

In another embodiment, an API 16 is provided for End to End (E2E) trusted HSM setup when configured as a microservice. The API can be a RESTful API using HTTP requests to produce and consume data related to network config services via at least one of a GET, PUT, POST, PATCH and DELETE command type. The API includes a command set for each stage of warranting, commissioning, and provisioning the HSM during initial set-up and for life-cycle HSM management, including but not limited to certificate management at each stage.

The Applications Programming Interface (API) 16 provides a connection between computers or between computer programs/applications, and/or between computers and people. It is a type of software interface, offering a service to other pieces of software. The API provides a communication channel between HSM components, internal processes 13 and/or micro services 14. These APIs are exposed on top of input/output (I/O) 20 interfaces. External systems and/or people communicate with HSM via the I/O interfaces 20, such as a basic user interface (UI) 21, or more sophisticated graphical user interface (GUI) 24 The HSM can also communicate with external systems through hardware 10 interfaces, such as the keyboard 22, serial port 23, smart card

25, Ethernet 26, optical ports, USB ports, etc. External systems (host computers in a data center) can also talk to HSM software interface via APIs exposed on top of individual hardware interfaces (e.g., network device driver, disk/memory management, etc.).

The HSM includes a local console 23 that is serial connected over e.g., a USB-C interface. The serial interface can be used by operations personnel, namely operators, referred to as DCOps (standing for Data Center Operations), who have physical access to the HSM for manually issuing commands to the HSM. Such USB-C interface is used, for all configuration throughout the HSM service, including initial configuration and cumbersome provisioning processes. The HSM also includes managerial Graphical User Interface (GUI) 24 that over an Ethernet 26 connection allow for remote configuration of the HSM. Also, the I/O 20 can be used to configure network settings, SSH certificates, upgrades, licenses and devices (e.g. CPU, Disk, memory, etc.). Operator (Java) cards 25 also provide a means for provisioning and securing the HSM using key shares and key splits.

The HSM also includes services 30 by way of modules, processes and service managers. Some services may be internal to the HSM, and others may be selectively exposed via the API gateway 16 to external entities or services. Examples of services 30 include authentication 31, authorization 32, session manager 33, enforcement 34, resource API manager 36, and quorum manager 37. Accordingly, service managers can be invoked/managed/configured remotely (external) via their APIs, for example, from a web based GUI (e.g. payShield Manager) via Internet connection over Ethernet to the HSM 10.

The HSM also includes (internal) resources 40 which can be externally configured via the normal I/O interfaces 20, and also, for some, (internally and externally) via any of the module/service managers 30 and their respective APIs. Examples of HSM resources include, but are not limited to, certificates, licenses, policies, device management, services, upgrades and so on. Each resource 40 has a respective API for software modules, processes or microservices to interact with the respective resource. The HSM offers access and services to each resource 40 via the resources API 36. Aside from payments HSM related tasks (e.g. encryption/decryption, key management, etc.), this includes: certificate/license management, SNMP, SSH, memory management/configuration, network management/configuration, upgrade installations/services, user resources, and so on.

The architectural style for APIs is typically categorized as either being SOAP (former acronym for "Simple Object Access Protocol", but referring now to a "Service Oriented Architecture", SOA for Web services) or REST (Representational State Transfer), and both are used to access Web services. While SOAP relies solely on XML to provide messaging services, REST offers a more lightweight method, using URLs in most cases to receive or send information. REST uses different HTTP 1.1 verbs, also known as access "methods" to perform tasks. These methods are GET, POST, PUT, and DELETE, which refers to the reading, updating, creating and deleting of operations concerning objects or resources, respectively. Unlike SOAP, REST does not have to use XML to provide the response. Some REST-based Web services output the data in Command Separated Value (CSV), JavaScript Object Notation (JSON) and Really Simple Syndication (RSS). The advantage with REST is that the output needed can be obtained in a form that is easy to parse within the language of the application specifically concerned.

In the embodiments presented herein, REST offers an alternative to, for instance, SOAP as method of access to a web service. In order to be used in a REST-based application, a web service needs to meet certain constraints. Such a web service is called RESTful. A RESTful web service is required to provide an application access to its web resources in a textual representation and support reading and modification of them with a stateless protocol and a predefined set of operations. By being RESTful, web services provide interoperability between the computer systems on the internet that provide these services. RESTful APIs embody the rules, routines, commands, and protocols that integrate the individual microservices, so they function as a single application. In a RESTful web service, requests made to a resource's URL will elicit a response with a payload formatted in HTML, XML, JSON, or some other format. The response can confirm that some alteration has been made to the resource state, and the response can provide hypertext links to other related resources. When HTTP is used, the operations (HTTP methods) available can comprise: GET, POST, PUT, DELETE, PATCH, and/or OPTIONS.

In some embodiments, the HSM device on cloud is equipped with a GNSS tracker as the part of its hardware. The HSM user interface can be modified to implement the use cases of data sovereignty on the cloud using the output of the GNSS tracker, without disclosing the location of HSM and there-by the location of the Data Center where the HSM is housed.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed, is:

1. An electronic hardware sub-system within a Hardware Security Module (HSM) suitable for use in securely servicing cryptographic requests from multiple tenant applications thereon to preserve end-to-end privacy, the electronic hardware sub-system comprising:

a hardware Main Processor (MP) incorporating more than one Virtual Functions (VFs) providing cryptographic services over more than one Peripheral Component Interconnect Express (PCIe) Physical Function (PF); and a hardware Security Processor (SP) responsive and supportive to the cryptographic services over a PCIe communication channel by way of one or more Crypto Units (CU) thereon communicatively coupled to the more than one Peripheral Component Interconnect Express (PCIe) Physical Function (FP);

wherein the MP includes its own Key Diversification Function (KDF) to produce VF Keys specific to each particular VF thereon, and the SP includes its own KDF to produce same VF Keys specific to a corresponding designated CU thereon for establishing a secure PCIe communication channel there between;

whereby the KDF produces a VF Key that logically isolates a particular VF from other VFs that all share the corresponding designated CU of the one or more CUs via end-to-end encryption of data lines terminating on a respective cryptographic block of the particular VF and the designated CU, the KDF receiving as input: a Session Key, a Virtual Function (VF) Identifier (ID), a Nonce, and an optional Initialization Vector (IV), wherein the MP executes its own Key Diversification Function and mixes sensitive data, encrypted by the VF Key, with non-sensitive data, encrypted by the Session Key, for both the particular VF and the other VFs in a same packet, and sends the packet to the SP with a packet header that logically isolates the particular VF from the other VFs;

wherein the SP executes its own Key Diversification Function and identifies the designated CU from a VF Number and an encoding flag in the packet header;

wherein the designated CU:

checks in its VF Key Cache indexed by the Nonce and the VF Number recovered from the packet header if the VF Key is available for that designated CU to use, otherwise, generates the VF Key by way of the KDF with the inputs;

wherein the SP decrypts from the same packet, the sensitive data using the VF Key according to the encoding flag;

wherein a request comprises a mix of secure and non-secure data, and the packet header for the request indicates which data are encrypted and not encrypted so that the designated Crypto Unit will respectively decrypt and not decrypt the data received;

whereby the KDF provides a Link Encryption and Key Diversification interoperability between the MP and the SP providing cryptographic and logical isolation between each particular VF of the MP and the corresponding CU of the SP over the secure PCIe communication channel for multiple tenant applications hosted by the MP on the HSM individually using and sharing the more than one PCIe PF over the more than one Virtual Function (VF) to the one or more Crypto Units (CU) for satisfying the request of the cryptographic services.

2. The electronic hardware sub-system of claim 1, wherein the Session Key and the VF Key are created by one of a DH, ECDH or Kyber key exchange using the NIST P521 curve, wherein by way of the MP, the key exchange is
i) negotiated between one or more Central Processing Units (CPU) of the MP, and one or more Central Processing Units (CPU) of the SP, thereby producing the Session Key; and ii) the VF Key is obtained by a Hash of the Session Key.

3. The electronic hardware sub-system of claim 2, wherein the Session Key is computed between the MP and SP at every Power-On-Reset or upon Firmware request.

4. The electronic hardware sub-system of claim 1, wherein the SP receives from the MP the request to get a signature(s) of a given Message (M) and modulus (N) where the packet header comprises:

[EncFlag=0-M||EncFlag=0-N||EncFlag=1-Enc(s)], where || stands for concatenation, wherein entries of EncFlag=0-M is a flag indicating to not encrypt (0) the Message (M), EncFlag=0-N is a flag indicating to not encrypt (0) the Modulus (N), EncFlag=1-Enc(s) is a flag indicating to encrypt (1) the signature(s), wherein the EncFlag entries indicate to the SP whether to use the designated CU to decrypt or not decrypt packet data using the VF key.

5. The electronic hardware sub-system of claim 1, wherein the MP provides data transfer error detection of data transmitted across the PCIe communication channel via an Output Feedback (OFB) block encryption by:

computing Cyclic Redundancy Check (CRC) on plaintext data to produce (Data) a Dcrc;

computing the VF Key using VF Number and the Session Key;

encrypting plaintext data in Output Feedback (OFB) Mode using as input the Initialization Vector (IV) to produce encrypted data; and transmitting the encrypted data and store (Data) the Dcrc in memory.

6. The electronic hardware sub-system of claim 5, wherein the SP provides data transfer error detection of data transmitted across the PCIe communication channel via an Output Feedback (OFB) block decryption by:

recovering the Dcrc from Descriptor Field of a received packet message;

recovering the VF Number and compute the VF key or retrieve from key cache;

decrypting the encrypted data in Output Feedback (OFB) Mode using as input the Initialization Vector (IV); and checking Cyclic Redundancy Check (CRC) on the Decrypted Data and compare to the Dcrc in memory.

7. A method for a Hardware Security Module (HSM) to securely service cryptographic requests from multiple tenant applications thereon to preserve end-to-end privacy, by way of an electronic hardware sub-system comprising:

a hardware Main Processor (MP) incorporating more than one Virtual Functions (VFs) providing cryptographic services over more than one Peripheral Component Interconnect Express (PCIe) Physical Function (PF); and a hardware Security Processor (SP) responsive and supportive to the cryptographic services over a PCIe communication channel by way of one or more Crypto Units (CU) thereon communicatively coupled to the more than one Peripheral Component Interconnect Express (PCIe) Physical Function (FP);

wherein the MP includes its own Key Diversification Function (KDF) to produce VF Keys specific to each particular VF thereon, and the SP includes its own KDF to produce same VF Keys specific to a corresponding designated CU thereon for establishing a secure PCIe communication channel there between;

whereby the KDF produces a VF Key that logically isolates a particular VF from other VFs that all share the corresponding designated CU of the one or more CUs via end-to-end encryption of data lines terminating on a respective cryptographic block of the particular VF and the designated CU, the method comprising the steps of:

the KDF receiving as input: a Session Key, a Virtual Function (VF) Identifier (ID), a Nonce, and an optional Initialization Vector (IV), wherein the MP executes its own Key Diversification Function and mixes sensitive data, encrypted by the VF Key, with non-sensitive data, encrypted by the Session Key, for both the particular VF and the other VFs in a same packet, and sends the packet to the SP with a packet header that logically isolates the particular VF from the other VFs;

wherein the SP executes its own Key Diversification Function and identifies the designated CU from a VF Number and an encoding flag in the packet header;

wherein the designated CU:

checks in its VF Key Cache indexed by the Nonce and VF Number recovered from the packet header if the VF Key is available for that designated CU to use, otherwise, generates the VF Key by way of the KDF with the inputs;

wherein the SP decrypts from the same packet, the sensitive data using the VF Key according to the encoding flag;

wherein a request comprises a mix of secure and non-secure data, and the packet header for the request indicates which data are encrypted and not encrypted so that the designated Crypto Unit will respectively decrypt and not decrypt the data received;

whereby the KDF provides a Link Encryption and Key Diversification interoperability between the MP and SP providing cryptographic and logical isolation between each particular VF of the MP and the corresponding CU of the SP over the secure PCIe communication channel for multiple tenant applications on the HSM individually using and sharing the more than one PCIe PF over the more than one Virtual Function (VF) to the one or more Crypto Units (CU) for satisfying the request of the cryptographic services.

8. The method of claim 7, wherein the Session Key and VF Key are created by one of a DH, ECDH or Kyber key exchange using the NIST P521 curve, wherein by way of the MP, the key exchange is i) negotiated between one or more Central Processing Units (CPU) of the MP, and one or more Central Processing Units (CPU) of the SP, thereby producing the Session Key; and ii) the VF Key is obtained by a Hash of the Session Key.

9. The method of claim 7, wherein the Session Key is computed between the MP and SP at every Power-On-Reset or upon Firmware request.

10. The method of claim 7, wherein the SP receives from the MP a request to get a signature(s) of a given Message (M) and modulus (N) where the packet header comprises:

[EncFlag=0-M∥EncFlag=0-N∥EncFlag=1-Enc(s)], where ∥ stands for concatenation, wherein entries of EncFlag=0-M is a flag indicating to not encrypt (0) the Message (M), EncFlag=0-N is a flag indicating to not encrypt (0) the Modulus (N), EncFlag=1-Enc(s) is a flag indicating to encrypt (1) the signature(s), wherein the EncFlag entries indicate to the SP whether to use the designated CU to decrypt or not decrypt packet data using the VF key.

\* \* \* \* \*